US008500524B2

(12) United States Patent
Kjeldsen et al.

(10) Patent No.: US 8,500,524 B2
(45) Date of Patent: Aug. 6, 2013

(54) METHOD AND APPARATUS FOR SUSPENDING POULTRY TO BE SLAUGHTERED

(75) Inventors: Poul Kjeldsen, Ebeltoft (DK); Torben Andersen, Grenaa (DK)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 13/637,368

(22) PCT Filed: Mar. 23, 2011

(86) PCT No.: PCT/DK2011/050097

§ 371 (c)(1), (2), (4) Date: Oct. 22, 2012

(87) PCT Pub. No.: WO2011/116774

PCT Pub. Date: Sep. 29, 2011

(65) Prior Publication Data

US 2013/0052924 A1 Feb. 28, 2013

(30) Foreign Application Priority Data

Mar. 26, 2010 (DK) ................................ 2010 70127

(51) Int. Cl.
*A22C 21/00* (2006.01)

(52) U.S. Cl.
USPC .......................................................... 452/179

(58) Field of Classification Search
USPC ................. 452/106, 110–114, 117, 120, 123, 452/177–184
See application file for complete search history.

(56) References Cited

U.S. PATENT DOCUMENTS

| | | | | |
|---|---|---|---|---|
| 4,272,863 | A * | 6/1981 | Parker, Jr. | 452/183 |
| 4,382,314 | A * | 5/1983 | Graham | 452/118 |
| 5,707,280 | A * | 1/1998 | Tieleman et al. | 452/117 |
| 7,004,830 | B2 * | 2/2006 | van der Steen et al. | 452/185 |
| 7,597,615 | B2 * | 10/2009 | van den Nieuwelaar et al. | 452/182 |
| 8,105,138 | B2 * | 1/2012 | Van Den Nieuwelaar et al. | 452/177 |
| 8,187,062 | B2 * | 5/2012 | Criscione et al. | 452/188 |

FOREIGN PATENT DOCUMENTS

| | | | |
|---|---|---|---|
| DE | 30 48 342 | A1 | 7/1982 |
| EP | 1 113 722 | B1 | 12/2002 |
| EP | 1 276 382 | B1 | 1/2007 |
| WO | WO 2009/002153 | A1 | 12/2008 |

* cited by examiner

*Primary Examiner* — Richard Price, Jr.

(74) *Attorney, Agent, or Firm* — Antonelli, Terry, Stout & Kraus, LLP.

(57) ABSTRACT

A method and apparatus for suspending living or stunned poultry to be slaughtered in conveyor brackets of an overhead conveyor. A belt conveyor delivers the poultry to a distribution surface, where the poultry are successively guided or pushed outwardly against an edge of the distribution surface to individual positions for receiving the poultry with the legs projecting from the edge of the positions. The legs are fixed in fixing means at the positions. The individual positions are then successively moved upwardly relative to the distribution surface to suspend the poultry for a subsequent downward movement of the positions by brackets of the overhead conveyor running above and spaced apart from the distribution surface. The positions are subsequently moved downwardly again to the level of the distribution surface.

6 Claims, 7 Drawing Sheets

4 2 4 12 12 8 10 8 18 6

METHOD AND APPARATUS FOR SUSPENDING POULTRY TO BE SLAUGHTERED

CROSS REFERENCE TO RELATED APPLICATION

Reference is made to DK 2010.70127 filed Mar. 26, 2010 of PCT/DK2011/050097 filed Mar. 23, 2011, which applications are incorporated herein by reference in their entirety.

BACKGROUND OF THE INVENTION

1. Field of the Invention

The present invention relates to a method for suspending poultry to be slaughtered and an apparatus for performing the method according to the invention.

2. Description of the Prior Art

Suspending poultry to be slaughtered, particularly live chickens, by way of example at the arrival to a poultry slaughterhouse in slaughter brackets of a slaughtering line, is a heavy as well as monotonous work that can be very stressing, mentally as well as physically. The same thing is true for the work of re-suspending slaughter poultry, in particular chickens, in conveyor brackets, by way of example, after dipping in a water chiller.

In addition, the work of suspending or re-suspending slaughter poultry causes serious work environment problems because the hard and monotonous work is known to cause load injuries to the workers' arms and legs.

EP 1 113 722 B1 discloses a method and an apparatus for suspending slaughter poultry, particularly chickens, in conveyor brackets on an overhead conveyor where the slaughtered chickens exiting from water chiller via a belt conveyor, are delivered at the middle of a rotating distribution table face, where devices are arranged for successively pushing the chickens outwards towards a rim area of the distribution table face. Each device receives one chicken which is placed such that the chickens' legs project out from the edge of the rim area such that the legs may be caught by a conveyor bracket on the overhead conveyor which in a synchronised way in an upwardly directed run passes close by the positions along the rim area of the distribution table face.

EP 1 276 382 B1 discloses a method for semi-automatic suspending live or stunned poultry, particularly chickens, where a rotating round table or distribution surface is used. Along the periphery are a number of positions along which is conveyed a chain with retainer clips in which the chickens are placed with the legs fixed in the retainer clips, as the chickens are subsequently transferred to brackets of an overhead conveyor.

SUMMARY OF THE INVENTION

The invention is an improved method for suspending poultry for slaughtering, which enables achieving a substantial alleviation of the heavy and monotonous lifting work such that the risk of load-associated injuries can be reduced correspondingly. At the same time, a more secure and gentle suspending of the chickens is achieved.

The method according to the invention has individual positions which are successively moved upwards relative to a distribution surface for suspending the chickens, which positions are subsequently moved downwardly by way of example in slaughtering brackets of the overhead conveyor which run above and are spaced apart from the distribution surface in a predominantly horizontal orientation. A part of the length of the conveyor extends close to the distribution surface. The brackets are subsequently moved downwardly again to the level of the distribution surface, and the fixing means during the suspending of the chickens are moved downwardly relative to the positions to contribute to downward movement of the legs of the chickens in the slaughtering brackets.

The invention provides a substantial alleviation of the heavy and monotonous lifting work and lessens the risk of load-associated injuries. At the same time, a more secure and gentle suspending of the chickens is achieved.

The method according to the invention may be applied where a rotating, substantially horizontal distribution surface is used, along the periphery of which the individual positions are disposed, which are modified such that an overhead conveyor is used which is spaced apart and above the distribution surface extends substantially horizontally along a straight partial length of the conveyor and tangentially past the periphery of the distribution surface.

The method according to the invention may be applied to a rectilinear, substantially horizontal distribution surface. The individual positions are disposed along the horizontal distribution surface which are modified so that an overhead conveyor is used which is spaced apart above the distribution surface and extends substantially horizontally along a semi-circular part length, by way of example in the form of a reversing wheel, past the edge of the distribution surface.

The invention also concerns an apparatus for suspending poultry, in particular living or stunned chickens to be slaughtered, in conveyor brackets, by way of example slaughter brackets of an overhead conveyor, for use by the method of the invention. The apparatus includes a distribution surface with a receiver position for chickens which are supplied successively via a belt conveyor, means for pushing the chickens successively outwards against an edge of the distribution surface which along the edge has individual positions for receiving and fixing chickens so that the chickens are disposed with the breast side or the back downwards and with the legs projecting from the edge of the distribution surface. The positions include fixing means for fixing the legs of the chickens. The apparatus has an overhead conveyor running close to the edge of the distribution surface spaced apart from and above the distribution surface, with the individual positions moving successively upwards relative to the distribution surface for suspending the chickens in the conveyor brackets, by way of example slaughtering brackets. The individual positions are subsequently moved downwards again to the level of the distribution surface and the fixing means during the suspending of the chickens are moved downwards relative to the positions to provide downward movement of the legs of the chickens in the exemplary slaughtering brackets.

In a preferred embodiment, the apparatus according to the invention includes a rotating, substantially horizontal distribution surface along the periphery of which the individual positions are disposed. The overhead conveyor extends spaced apart from and above the distribution surface, substantially horizontally along a straight part length and tangentially past the periphery of the distribution surface.

Alternatively, the apparatus according to the invention includes a rectilinear, substantially horizontal distribution surface along the periphery of which the individual positions are disposed. The overhead conveyor extends spaced apart from and above the distribution surface and substantially horizontally along a semi-circular part length, by way of example in the form of a reversing wheel, past the edge of the distribution surface.

BRIEF DESCRIPTION OF THE DRAWINGS

The invention is explained more closely in the following with reference to the drawing, on which.

DETAILED DESCRIPTION OF EMBODIMENTS OF THE INVENTION

Figure 1:
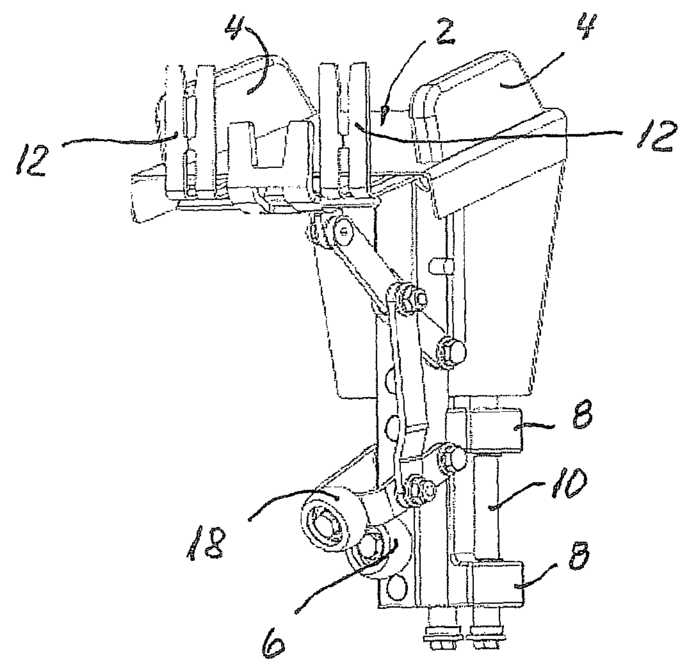
FIG. 1 shows a perspective view of an embodiment of a vertically adjustable position in the form of a support plate with associated lateral guide and fixing means for the legs of poultry to be slaughtered, particularly a chicken, for an apparatus according to the invention.

FIG. 1 shows an embodiment of a vertically adjustable position or support face 2 with associated lateral guides 4 which by means of a guide roller 6 may be vertically adjusted on slide guides 8 on vertical slide rods 10. Each position/support surface 2 also interacts with fixing means 12 for fixing the legs 14 of a slaughter poultry 16, in particular a chicken. The fixing means 12 is moved upwards and downwards by means of a guide roller 18 which similarly to the guide roller 6, interacts with guide rails which are not illustrated.

Figure 2:
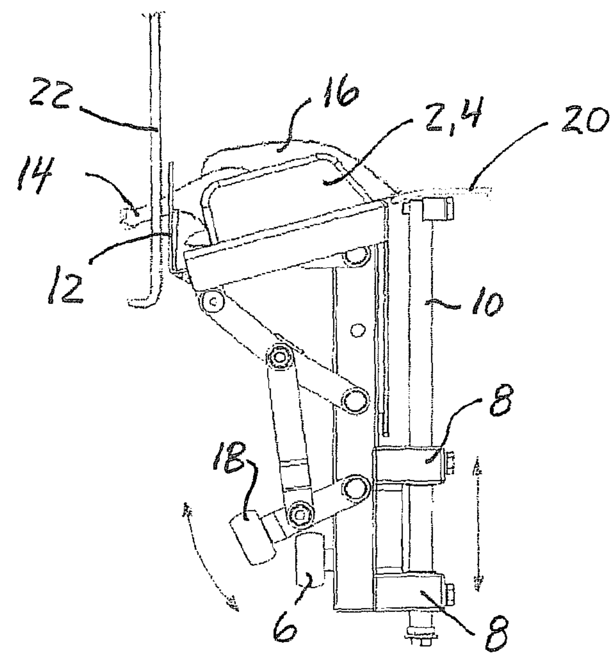
FIG. 2 shows a plan side view of the support plate shown in FIG. 1, shown with outwardly/downwardly directed support plate, by way of example for use in re-suspending a chicken which is disposed with the breast facing upwards and with the legs fixed in fixing means and inserted in a conveyor bracket of an overhead conveyor.

FIG. 2 shows a slaughter poultry 16 disposed with the breast side facing upwards on the support face 2 which slopes outwards/downwards relative to a distribution surface 20. The legs 14 are fixed in the fixing means 12 and inserted in a conveyor bracket 22, ready for suspending in the latter.

Figure 3:
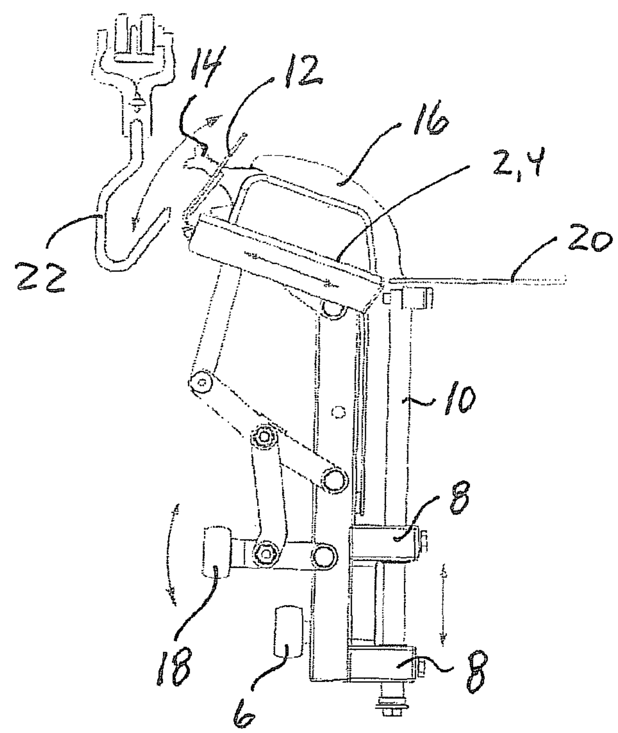
FIG. 3 shows a plan side view of the support plate shown in FIG. 1, shown with outwardly/upwardly directed support plate, by way of example for use in re-suspending a chicken which is disposed with the back side facing upwards and with the legs fixed in fixing means and inserted in a conveyor bracket of an overhead conveyor.

FIG. 3 shows a slaughter poultry 16 disposed with the breast side facing upwards on the support face 2 which slopes outwards/upwards relative to a distribution surface 20. The legs 14 are fixed in the fixing means 12, ready to be re-suspended in a special conveyor bracket 22 after passing through an air-chiller and/or after water chiller.

Figure 4:
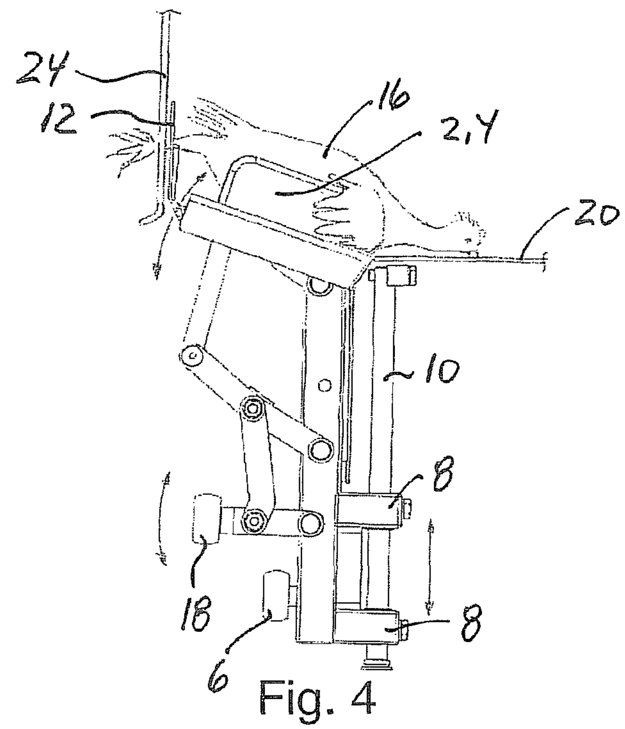
FIG. 4 shows a plan side view of the support plate shown in FIG. 1, shown with outwardly/upwardly directed support plate, by way of example for use in suspending a live or stunned chicken which is disposed with the back side facing upwards and with the legs fixed in fixing means and inserted in a slaughter brackets of an overhead conveyor.

FIG. 4 shows suspension of live or stunned slaughter poultry 16 disposed with the back side facing upwards on the support face 2 which slopes outwards/upwards relative to a distribution surface 20. The legs 14 are fixed in the fixing means 12 and inserted in slaughter bracket 24, ready for suspension in the latter when the fixing means 12 by means of the guide roller 18 are moved downwards again relative to the slaughter bracket 24.

Figure 5:
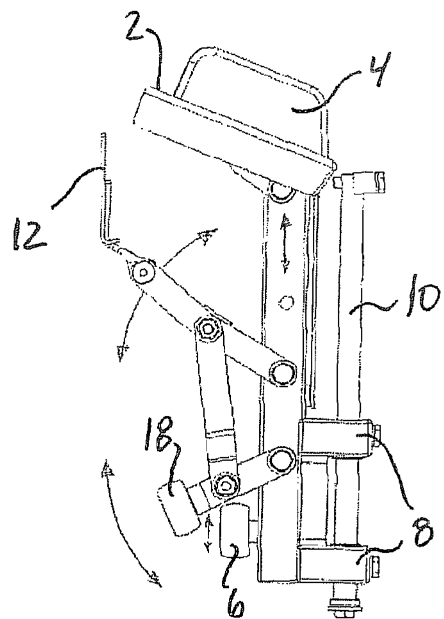
FIG. 5 shows a plan sideview of the support plate shown in FIG. 1, shown with outwardly/upwardly directed support plate, and with fixing means pivoted downward for releasing the legs.
Figure 6:
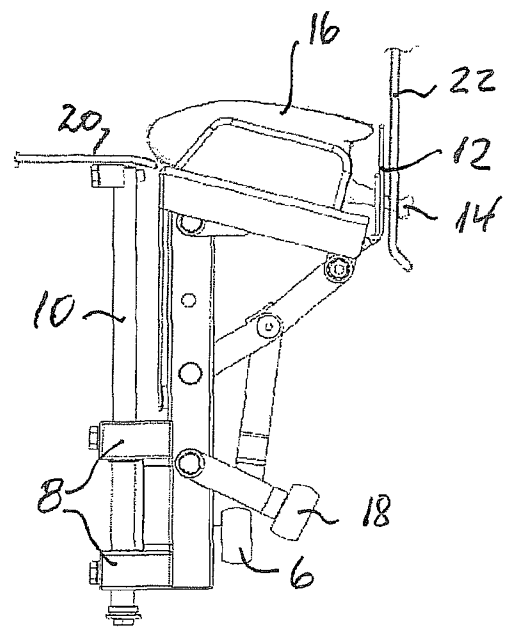
FIG. 6 shows a plan side view of the support plate shown in FIG. 1, shown with outwardly/downwardly directed support plate, by way of example for use in re-suspending a chicken which is disposed with the back side facing upwards and with the legs fixed in fixing means and inserted in a conveyor bracket of an overhead conveyor.

FIG. 5 illustrates how the fixing means 12 are moved downwards for releasing the legs of the slaughter poultry 16, whereas FIG. 6 shows a situation where slaughter poultry 16 is placed on a support face 2 with the back side facing upwards and the legs 14 fixed in the fixing means and inserted in a conveyor bracket 22.

Figure 7:
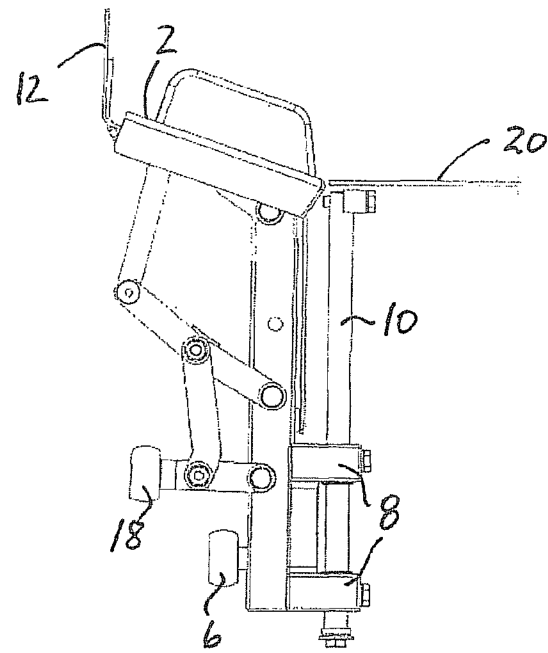
FIG. 7 shows a plan sideview of the support plate shown in FIG. 1, shown with outwardly/upwardly directed support plate, for illustrating how the support plate by way of example is tilted relative to the distribution surface by means of mechanical guide rollers and guide rails.

FIG. 7 illustrates how vertical disposition of support face 2 and pivoting of the fixing means 12 are controlled by means of the support rollers 6 and 18 by interaction with stationary guide rails which are not illustrated.

Figure 8:
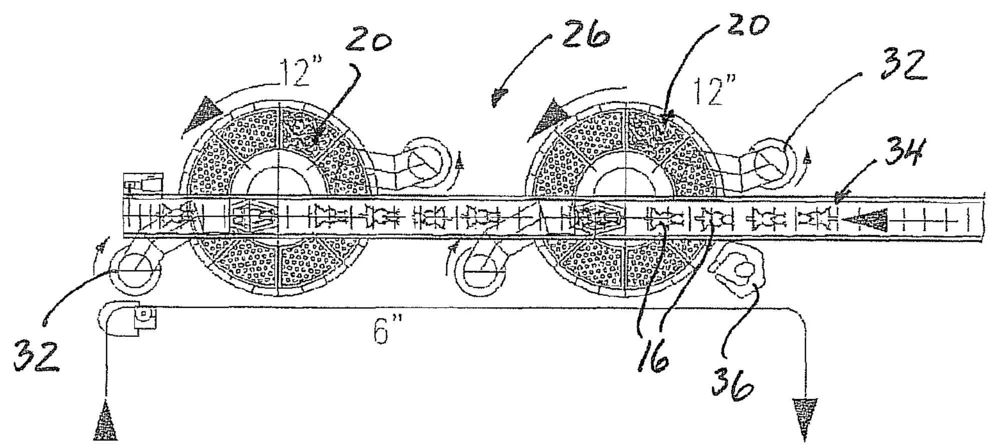
FIG. 8 shows a plan view of an embodiment of an apparatus according to the invention for automatic suspension of slaughter poultry on 6" slaughter line by using two 12" rotating distribution surfaces with associated robots.

FIG. 8 shows an embodiment of an apparatus 26 for automatic suspension of slaughter poultry 16 according to the invention, where slaughter poultry 16 is supplied to two 12" rotating distribution surfaces 20 via a straight feed belt 34 for automatic suspension on a 6" slaughter belt. The two 12" distribution surfaces are mutually offset 6" such that slaughter poultry 16 along each their distribution surface 20 are suspended on every other slaughter bracket. The apparatus 26 is operated by four robots 32 and one person 36.

Figure 9:
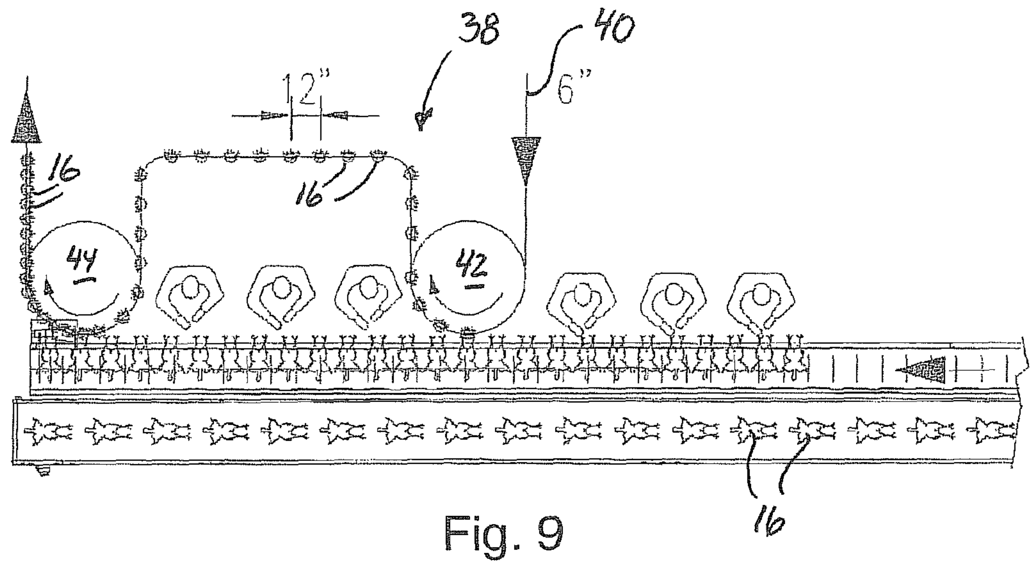
FIG. 9 shows a plan view of a second embodiment of an apparatus according to the invention for manual suspension of slaughter poultry in a straight line by 2 turns on 6" slaughter line by means of two reversing wheels for an overhead conveyor.

FIG. 9 shows an embodiment of an apparatus 38 for semi-automatic suspension of slaughtered poultry 16 on a straight line, where a 6" slaughter belt 40 via a first reversing wheel 42 at first suspends a slaughtered poultry 16 on every other slaughter bracket 22, and then via a second reversing wheel 44 suspends a slaughter poultry 16 on the remaining slaughter brackets.

Figure 10:
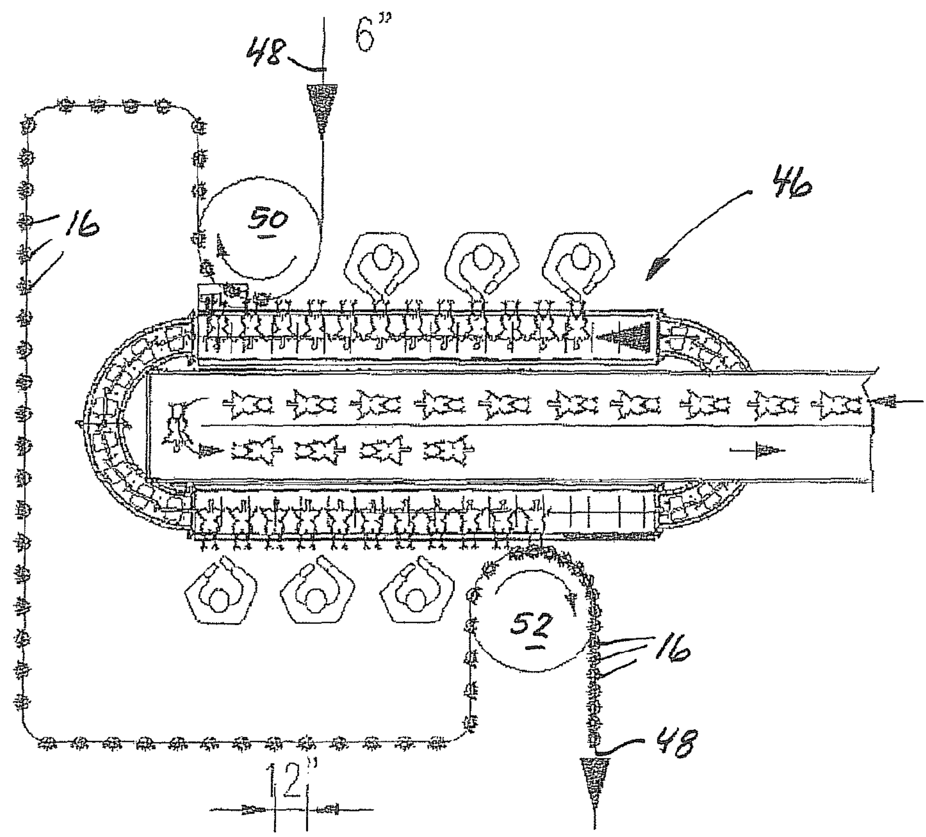
FIG. 10 shows a plan view of a third embodiment of an apparatus according to the invention for manual, compact suspension of slaughter poultry in a straight line by 2 turns on 6" slaughter line by means of two reversing wheels at each their side of a rectilinear feed conveyor.

FIG. 10 shows an embodiment of a compact apparatus 46 for semi-automatic suspension of slaughtered poultry 16 on a straight line, where a 6" slaughter belt 48 via a first reversing wheel 50 at one side of the apparatus 46 at first suspends a slaughtered poultry 16 on every other slaughter bracket 22, and then via a second reversing wheel 52 at the opposite side of the apparatus 46 suspends a slaughtered poultry 16 on the remaining slaughter brackets 22.

Figure 11:
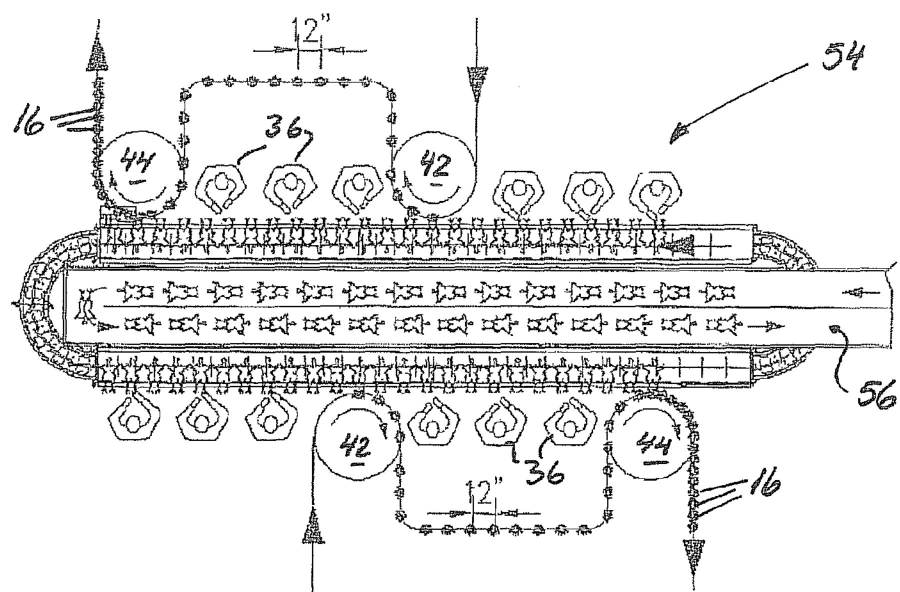
FIG. 11 shows a plan view of yet another embodiment of an apparatus according to the invention for manual suspension of slaughter poultry in straight line by 2 turns at opposite sides of a rectilinear, double feed conveyor on 2 slaughtering lines with 6" pitch.

FIG. 11 shows an embodiment of an apparatus 54 for semi-automatic suspension in a straight lie for simultaneous suspending on two 6" slaughter belts where at each their side of a central double feed belt 56 described in connection with FIG. 9 the apparatus 38 is repeated, that is at each their side two reversing wheels 42, 44 are used, where at first via the reversing wheels 42 slaughter poultry 16 is suspended on every other slaughter bracket 22, and then via the reversing wheels 44 slaughter poultry 16 is suspended on the remaining slaughter brackets 22, occurring simultaneously at both sides of the apparatus 54 which furthermore can be equipped with robots 32 as well as workers 36.

Figure 12:
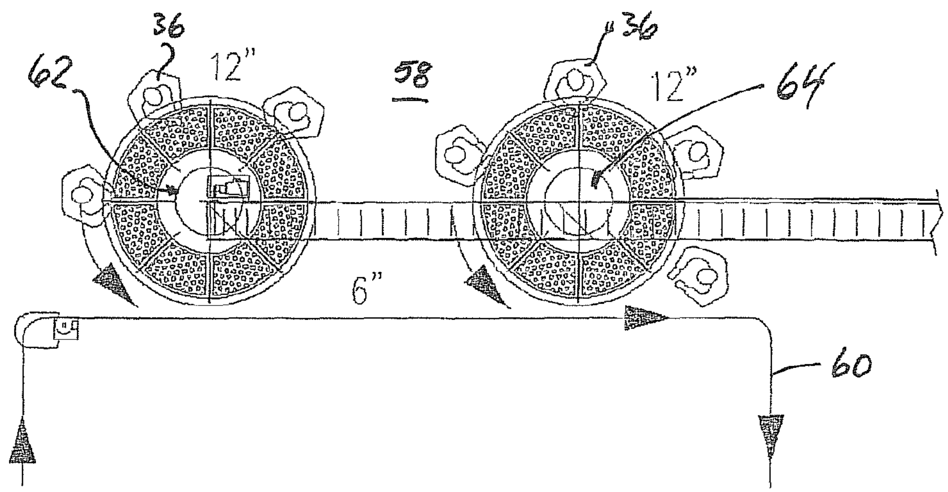
FIG. 12 shows a plan view of a further embodiment of an apparatus according to the invention for semi-automatic suspension of slaughter poultry by 2 turns on 6" slaughter line by using two rotating distribution surfaces to which slaughter poultry is supplied by means of a straight conveyor belt.

Finally, FIG. 12 shows a preferred embodiment of an apparatus 58 for semi-automatic suspension of slaughter poultry 16 on a 6" slaughter belt 60 by means of two rotating 12" distribution surfaces 62 and 64 where the suspension positions are mutually offset 6" such that via the distribution surface 62 at first a slaughtered poultry 16 is suspended on every other slaughter bracket 22, after which via the distribution surface 64 a slaughtered poultry 16 is suspended on the remaining, empty slaughter brackets 22.

Figure 13:
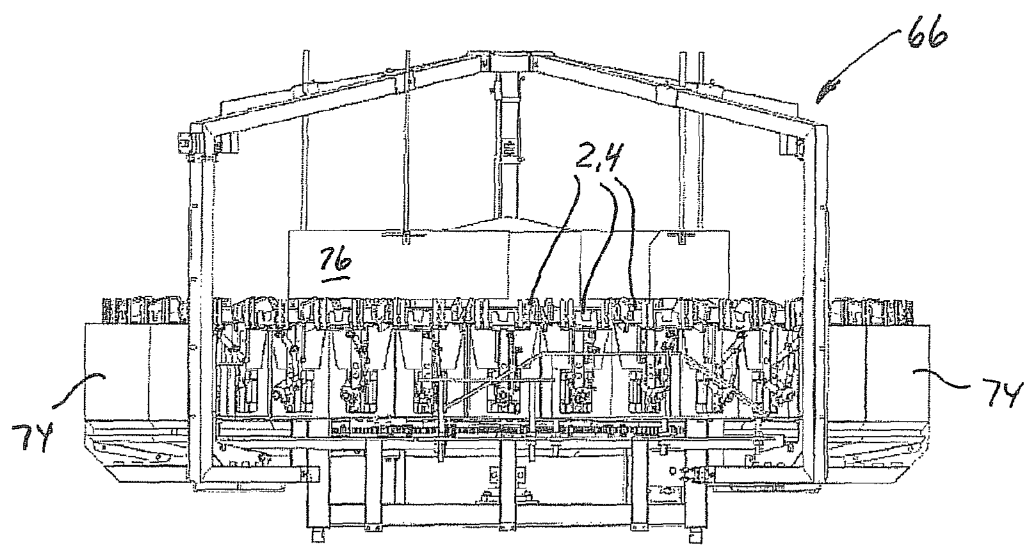
FIG. 13 shows a plan sideview of a preferred embodiment of an apparatus according to the invention, including a substantially horizontal, rotating distribution surface along the periphery of which a large number of positions are arranged, each equipped with vertically adjustable support plates of FIG. 1.
Figure 14:
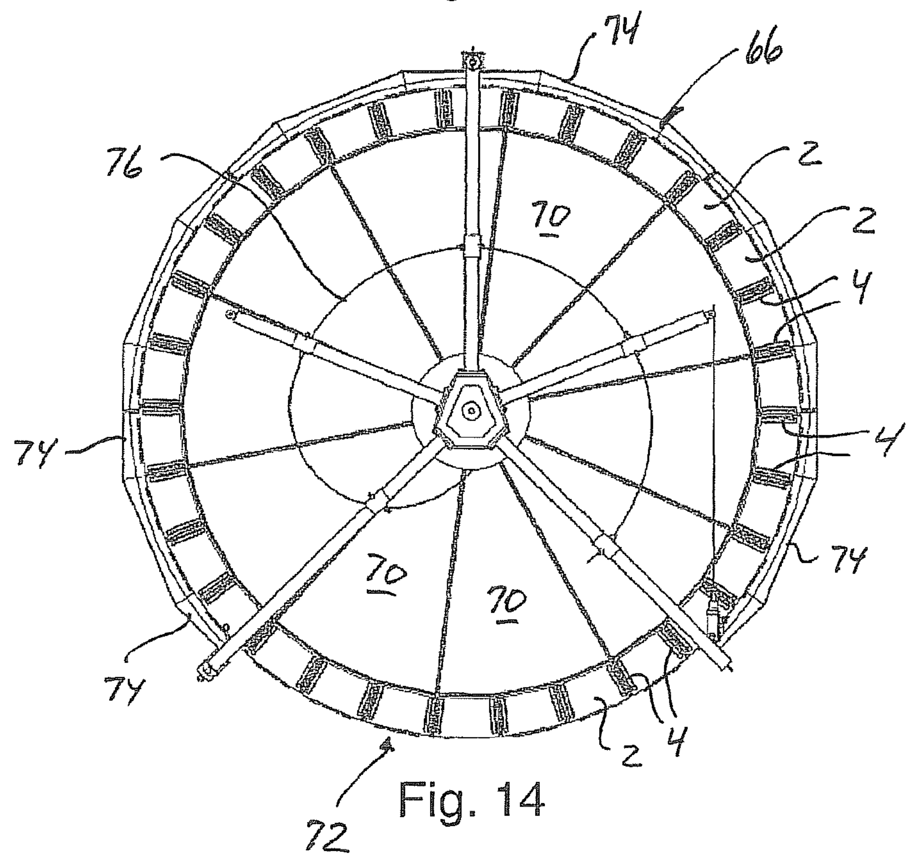
FIG. 14 shows a plan view of the apparatus shown in FIG. 13, as seen from the top.

FIGS. 13 and 14 show a preferred apparatus 66 which includes a rotating distribution surface 68 along the periphery of which is arranged 30 positions/support surfaces 2 of FIG. 1, with associated guide rollers 6, 18 and guide rails. As most clearly seen in FIG. 14, the distribution surface 68 is divided into ten plate sectors 70, and opposite each of these plate sectors 70 are arranged three vertically adjustable positions/support surfaces 2.

Apart from a suspension zone 72 where respective guide rollers are to interact with interacting guide rails in order to provide vertical adjustment, the apparatus 66 is screened by means of mutually sectioned screen plates 74. In a way known per se, stationary helical guide plates 76 provide for conducting slaughter poultry outwards towards the suspension zone 72 along the periphery of the distribution surface 68.

In other words, the round table or the rotating distribution surface, instead of elevating the conveyor track suspended from the ceiling, is provided with lifting/lowering units disposed at the periphery of the round table/distribution surface. The legs or feet of the poultry may thereby, by utilizing a straight section of the suspended conveyor track which runs as a tangent to the periphery of the rotating table, are inserted in the brackets while at the same time the unit, upon which the poultry is placed, is then lowered such that the poultry is transferred to the brackets.

The support surface can be designed to tilt by means of a curved guide to a given angle so that the best possible insertion of legs or feet in the brackets is achieved. This is necessary with regard to whether the poultry is lying on the back or on the breast. By means of suitable curved guides, the support surface may also be moved inwardly and outwardly in relation to the center line of the ceiling-suspended conveyor track, thereby compensating for pitch circle differences, wear on overhead conveyor etc.

Prior methods for suspending live or stunned poultry are particularly encumbered by each poultry having to be lifted a given distance from a table surface, conveyor or transport box and inserted in a conveyor bracket or slaughter bracket. It is a very frequently repeated lifting of about 1000 birds of about 2-2.5 kg apiece per person and a reach distance of more than half a meter. This very stressful lifting is taken over by the apparatus according to the invention as the workers only have to pull the poultry from the middle of the table to the periphery and then clip the legs or feet securely in the fixing means.

This manual work may possibly be combined in that one or more persons move the birds out to the support faces at the periphery of the round table and that the legs/feet subsequently are secured by clipping by one or more persons. The manual work will hereby be further facilitated and the ergonomics in the suspension process will be improved.

The support faces are fastened along the periphery and move together with the rotating distribution surface, and at the same time the movable arms are activated by the support faces by stationary (adjustable) curve guides, and thereby the movement and angles in three planes of the support face may be controlled such that feet or legs are inserted correctly in the suspension brackets when passing synchronously with the distribution surface.

The support faces are moveable in multiple ways, and all movements are controlled by curve guides such that any imaginable movement, up/down, in/out and tilting together or individually can be performed for any imaginable suspension task and suspension bracket. The support faces may also be provided with individual weighing cells such that the poultry is weighed when the support face is lifted off the distribution surface and each poultry is not touching another poultry or anything else. This will provide a very exact weight which is important to know for the slaughterhouse for the subsequent process and the end product.

Alternatively, the invention is performed by means of a straight conveyor with lifting/lowering support faces running as a tangent to a reversing wheel suspended at the ceiling with conveyor brackets which thereby can perform the same method.

The invention claimed is:

1. A method for suspending poultry to be slaughtered held in conveyor brackets of an overhead conveyor, comprising:

delivering the poultry by a belt conveyor onto a distribution surface on which the poultry is guided or pushed outwardly against an edge of the distribution surface to individual positions which receive the poultry at which the legs project from an edge of the positions, fixing the legs at the positions to fixing means;

moving the individual positions successively upwardly relative to the distribution surface to suspend the poultry for a subsequent downward movement of the positions, running the brackets of the conveyor above and spaced from the distribution surface along a part of the conveyor extending past the distribution surface, moving the positions to a level of the distribution surface, and moving the fixing means during suspension of the poultry downwardly to the positions to provide downward movement of the legs of the poultry in the brackets.

2. A method according to claim 1 comprising:

providing a rotating, substantially horizontal distribution surface with individual positions disposed on a periphery of the surface and running an overhead conveyor spaced apart from and above the distribution surface substantially horizontally along a straight part of the conveyor to move tangentially past a periphery of the distribution surface.

3. A method according to claim 1 comprising:

providing a rectilinear, substantially horizontal distribution surface, along an edge of which the individual positions are disposed and running the conveyor spaced apart from and above the distribution surface substantially horizontally along a semi-circular part length of a reversing wheel past the edge of the distribution surface.

4. An apparatus for chickens to be slaughtered in conveyor brackets of an overhead conveyor, comprising:

a distribution surface for receiving poultry which are supplied successively from a belt conveyor, means for pushing the poultry successively outwardly along the surface against an edge of the distribution surface to individual positions at which the poultry is received and fixed with the breast side or the back side downward and legs projecting from the edge of the distribution surface, the positions including fixing means for fixing the legs of the poultry, the overhead conveyor being spaced apart and above the edge and the individual positions move successively upwardly relative to the distribution surface for suspending the poultry in the conveyor brackets and move downwardly to a level of the distribution surface, and the fixing means during suspension of the poultry are moveable downwardly relative to the positions to provide downward movement of the legs of the poultry in the brackets.

5. An apparatus according to claim 4 comprising a rotating substantially horizontal distribution surface with individual positions, the individual positions being disposed along a periphery of the distribution surface with the overhead conveyor being spaced apart from and above the edge and the distribution surface extending substantially horizontally along a straight path tangentially past a periphery of the distribution surface.

6. An apparatus according to claim 4 comprising a rectilinear substantially horizontal distribution surface with individual positions, the individual positions being disposed along the edge with the overhead conveyor being spaced apart from and above the distribution surface and extending substantially horizontally along a semi-circular part of a reversing wheel past the edge of the distribution surface.

* * * * *